L. M. SNOW.
MACHINE FOR MEASURING AND ROLLING WALL PAPER.
APPLICATION FILED JUNE 4, 1913.

1,134,924.

Patented Apr. 6, 1915.
2 SHEETS—SHEET 1.

L. M. SNOW.
MACHINE FOR MEASURING AND ROLLING WALL PAPER.
APPLICATION FILED JUNE 4, 1913.
1,134,924.
Patented Apr. 6, 1915.
2 SHEETS—SHEET 2.
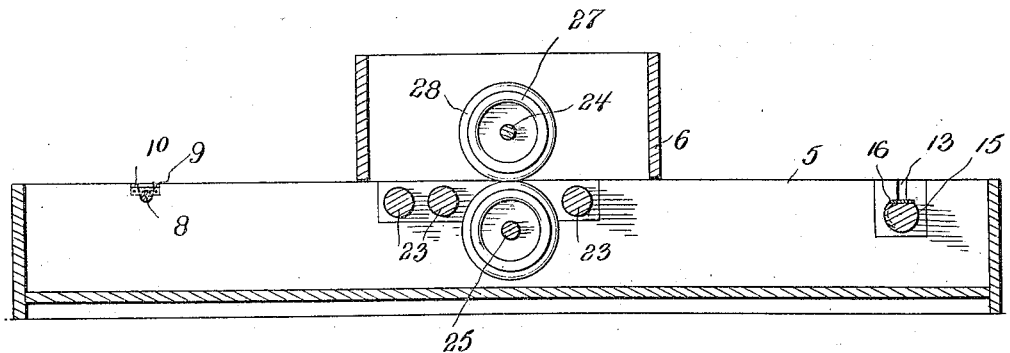
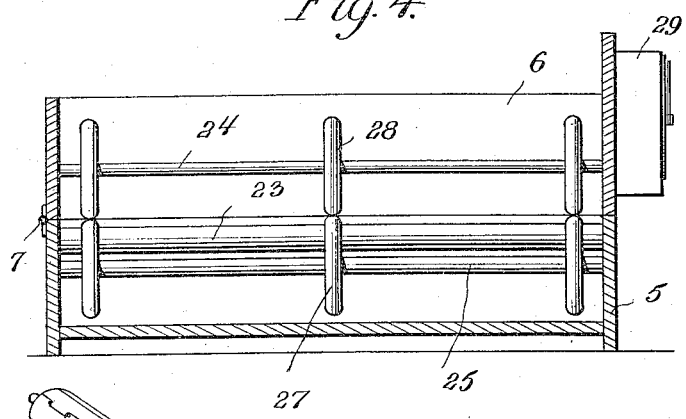
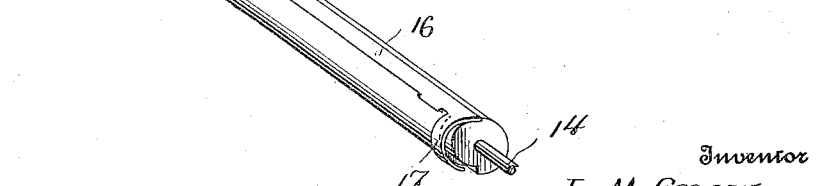
Inventor
L. M. Snow.
Witnesses
William Smith
By Victor J. Evans
Attorney

UNITED STATES PATENT OFFICE.

LOUIS M. SNOW, OF PROVINCETOWN, MASSACHUSETTS.

MACHINE FOR MEASURING AND ROLLING WALL-PAPER.

1,134,924. Specification of Letters Patent. Patented Apr. 6, 1915.

Application filed June 4, 1913. Serial No. 771,713.

*To all whom it may concern:*

Be it known that I, LOUIS M. SNOW, a citizen of the United States, residing at Provincetown, in the county of Barnstable and State of Massachusetts, have invented new and useful Improvements in Machines for Measuring and Rolling Wall-Paper, of which the following is a specification.

The invention relates to measuring devices, and more particularly to the class of combined measuring and rolling machines for wall paper or the like, especially adapted for use in retail establishments.

The primary object of the invention is the provision of a machine of this character wherein wall paper, borders therefor, or the like can be accurately measured as to length and rolled for the convenient handling thereof, thus enabling a person to accurately determine the length of the paper to be cut from the roll without requiring the use of a yardstick, measuring tape, or other like device ordinarily used, and also which will roll the paper without causing the tearing or the kinking or mutilation of the edges of the paper while being rolled.

Another object of the invention is the provision of a machine of this character in which the paper will be automatically rolled smoothly while being measured so that a person can determine the exact amount of paper sold, thereby minimizing labor and time ordinarily employed in measuring wall paper, its borders, or the like.

A further object of the invention is the provision of a machine of this character which is extremely simple in construction, thoroughly reliable and efficient in operation, and inexpensive in manufacture.

With these and other objects in view, the invention consists in the construction, combination and arrangement of parts as will be hereinafter fully described, illustrated in the accompanying drawing, and pointed out in the claim hereunto appended.

Figure 1:
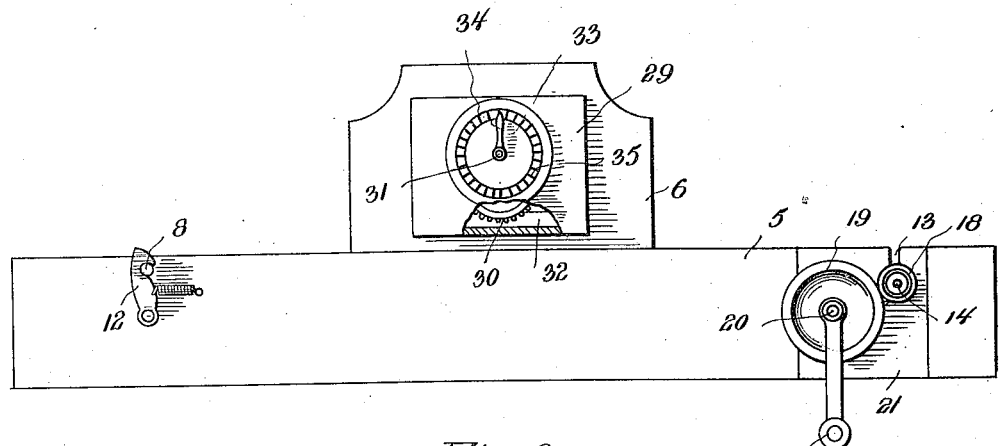
Figure 2:
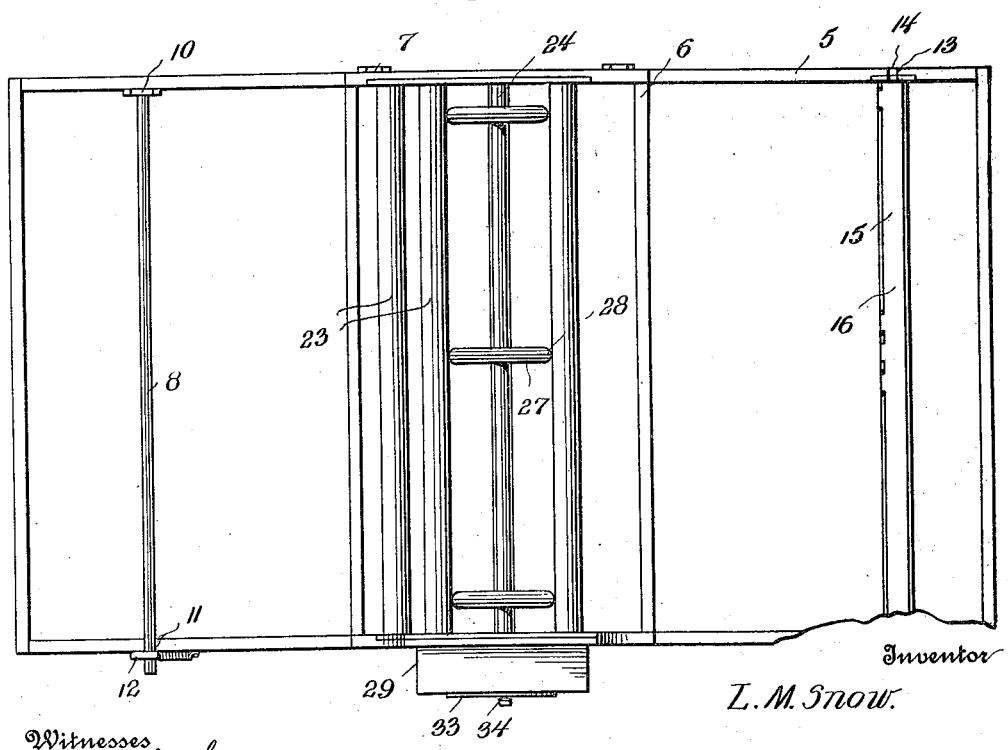

In the drawings: Figure 1 is a side elevation of a machine constructed in accordance with the invention. Fig. 2 is a top plan view thereof. Fig. 3 is a vertical longitudinal sectional view through the same. Fig. 4 is a transverse sectional view on the line 4—4 of Fig. 2. Fig. 5 is a perspective view of the paper winding roller detached from the machine.

Similar reference characters indicate corresponding parts throughout the several views in the drawings.

Referring to the drawings in detail, the machine comprises a box or tray-like body 5 on which, medially thereof, is swingingly mounted a frame 6 which normally lies transversely thereof and is connected to one of its longitudinal side walls by means of hinges 7, while swingingly connected to the body 5 at one side of the frame 6 is a paper roll supporting rod 8, one end of which is rigidly attached to one leaf 9 of a hinge 10 to permit the swinging thereof, and its other end is adapted to engage in a notch 11 provided in the body 5 when the said rod 8 has been lowered, the free end of the rod 8 being engaged by means of a spring-held catch or latch 12 which retains it in the notch 11 when supporting a paper roll thereon. On the raising of the rod 8 the paper roll can be readily placed thereon or removed therefrom.

Formed in the longitudinal side walls of the body 5 at the opposite side of the frame 6 are alining notches 13 in which is detachably engaged the axle 14 of a paper winding roller 15 on which is mounted a spring-held clamping jaw 16 formed at one end with a releasing arm 17, the axle 14 at one end being provided with a friction wheel 18 engaging a driving friction wheel 19 journaled upon a stud axle 20 projecting outwardly from a base plate 21 fixed exteriorly to the body 5, and this wheel 19 has connected thereto a handle or crank 22 which permits the rotation thereof. The paper roll supported by the rod 8 is adapted to have one end engaged by the clamping jaw 16 on the roller 15 so that on the turning of the crank or handle 22 the paper will be wound upon the said roller 15, the paper being trained over guide rollers 23 journaled in the body 5 transversely thereof intermediate the ends of the same. It will be apparent that the rollers 23 are located within the tray-like body 25 in the same plane with each other and are closely arranged in spaced parallel relation at the left hand side of the wheels 27 so that the sheet material when passed over the uppermost points of the peripheries of these rollers will be smoothly conveyed between the wheels 27, respectively.

Mounted in the body 5 and the frame 6 are rotatable shafts 24 and 25 respectively on which are fixed friction wheels 27, the peripheries of which carry resilient treads 28 which engage the paper fed over the guide rollers 23 so that as the paper is fed thereover the shafts 24 and 25 will rotate, the shaft 24 being connected with and adapted to operate a measuring or registering device presently described.

Mounted at one end of the frame is a detachable housing or casing 29 in which is located the mechanism of the measuring device or register which comprises a train of clock gearing 30, one gear of which is fixed to the shaft 25, while the arbor 31 of the other gear is journaled in a frame 32 located within the housing 29 and carried by the frame 6, one end of the arbor 31 being extended centrally through a graduated dial 33 fixed to the outer face of the housing 29 and over which traverses or moves an indicator hand or pointer 34 which is fixed to the said arbor 31 to coöperate with the graduated marks 35 on the dial 33 for accurately measuring the paper as the same is being wound upon the roller 15 in the machine so that the operator on glancing at the measuring device or register can accurately determine the exact length of paper without necessitating the measuring of the paper by a yardstick, measuring tape or the like as usual. It will be apparent that as the paper is rolled the same is simultaneously measured, thereby minimizing labor and time when the device is used.

The arm 17 of the jaw 16 permits the convenient manipulation of the said jaw for engaging the end of the paper thereby or for releasing the said end of the paper when it is desired to remove it from the roll 15 in the machine.

From the foregoing it is thought that the construction and manner of operation of the device will be clearly understood, and therefore a more extended explanation has been omitted.

What is claimed is:—

A machine of the class described comprising a box-like body formed near one end with notches opening through the upper edge thereof, a bearing mounted interiorly of the body at one side thereof near the other end of the same, the said body being formed with a notch arranged in alinement with the bearing, a paper roll support detachably engaged in the bearing in the said notch, spring-held means carried by the body and engageable with the support to lock the same in the notch, a frame superimposed upon the body medially thereof, parallel shafts journaled in the respective body and frame, rubber tired wheels fixed to said shafts and frictionally contacting with each other, measuring mechanism supported upon the frame and operated by one of the shafts, a winding roll having its journals engaged in the notches in the body, friction means supported by the body for driving the winding roll, a spring-held clamping jaw carried by the winding roll and having a releasing arm at one end, the said roll being cut away at the point of the releasing arm to permit free movement thereof, and guide devices on opposite sides of the parallel shafts journaled in the body and frame.

In testimony whereof I affix my signature in presence of two witnesses.

LOUIS M. SNOW.

Witnesses:
MYRICH C. YOUNG,
H. L. PITTSLOW.

Copies of this patent may be obtained for five cents each, by addressing the "Commissioner of Patents, Washington, D. C."